United States Patent

[11] 3,581,856

[72] Inventor Lambert W. Fleckenstein
 4445 N. 135th St., Brookfield, Wis. 53005
[21] Appl. No. 822,186
[22] Filed May 6, 1969
[45] Patented June 1, 1971

[54] TRANSVERSE ENGAGING, PIVOTED PAWL CLUTCH
 12 Claims, 7 Drawing Figs.
[52] U.S. Cl. .................................................. 192/28, 192/33
[51] Int. Cl. ..................................................... F16d 11/06
[50] Field of Search ........................................... 192/28, 33

[56] References Cited
UNITED STATES PATENTS
577,247  2/1897  Geb.............................. 192/28
1,765,527  6/1930  Gollnick et al. ................ 192/28
1,919,651  7/1933  Helsel............................ 192/28
2,150,227  3/1939  Lake et al. ..................... 192/28UX
2,328,653  9/1943  Lake et al. ..................... 192/28

Primary Examiner—Benjamin W. Wyche
Attorney—Andrus, Sceales, Starke & Sawall

ABSTRACT: A clutch for coupling a driving member to a driven member. The driving member includes a circular plate having peripheral teeth. The driven member includes a first disc coaxial with the circular plate and having a pivoted pawl for engaging the peripheral teeth to engage the clutch. The pawl is moved into and out of engagement with the peripheral teeth by a second disc which is relatively movable with respect to the first disc. The second disc contains camming surfaces which coact with the pawl to provide the desired pawl movement during the relative movement of the discs.

PATENTED JUN 1 1971 3,581,856

Inventor
Lambert N. Fleckenstein
By Lieber & Niller
Attorney

Inventor
Lambert W. Heckenstein
By Lieber + Niller
Attorney

TRANSVERSE ENGAGING, PIVOTED PAWL CLUTCH

BACKGROUND OF THE INVENTION

The present invention relates to clutches of the transversely engaging pivoted pawl type and to improved clutches of the aforesaid type having construction and operational features not heretofore found.

SUMMARY OF THE INVENTION

The present invention is directed to an improved clutch for selectively coupling a driving member to a driven member for rotating the latter from a power source. The clutch includes the base member having a driving member comprised of a circular plate journaled therein. The circular plate is rotatably drivable by the power source and has teeth about the periphery thereof.

The driven member of the clutch includes a first disc journaled on the base member coaxially with the circular plate. The first disc is axially adjacent the plate and has a greater radial dimension. A pawl is pivotally mounted on the first disc at a point located a greater radial distance from the common axis of the first disc and circular plate than the radius of the latter. The pawl is pivotally movable into and out of engagement with the peripheral teeth of the circular plate.

A second disc is journaled on the base member coaxially with the first disc. Means are provided in the clutch to link the second disc to the first disc for rotating the former with the latter while, at the same time, permitting limited reciprocal arcuate movement of the second disc with respect to the first disc. The second disc contains camming surfaces engaging the pawl for pivotally moving the pawl into and out of engagement with the peripheral teeth of the circular plate during the limited relative movement of the first and second disc.

DESCRIPTION OF THE PREFERRED EMBODIMENT

Figure 1:
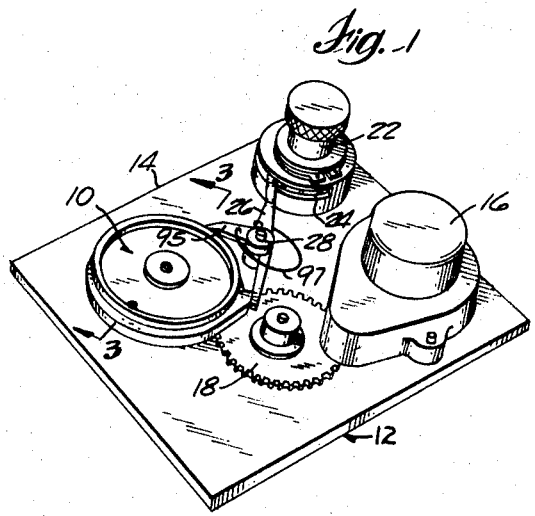
FIG. 1 is a perspective view of the clutch of the present invention, the clutch being typically shown as incorporated in a timing means.

Turning now to the FIGS. there is shown therein, the clutch 10 of the present invention. Clutch 10 is shown in an exemplary manner as incorporated in a timing means 12, it being understood that the clutch has numerous other applications. Timing means 12 includes a base member 14 on which are mounted the various elements thereof, including clutch 10. Timing means 12 includes timing motor 16 which serves as a power source for the timing means. Timing motor 16 drives timing gear 18 which in turn drives the driving member of clutch 10, in a manner hereinafter described. In its present application, clutch 10 may be used to couple the driving member connected to, and driven by, timing motor 16 to a driven member containing an output shaft on which may be mounted electrical switching apparatus.

Base member 14 includes a means 20 for initiating the operation of clutch 10. This means may comprise shaft 22 having a series of detents 24 engaging trigger bar 26. Trigger bar 26 is pivotally mounted on base member 14 by journal 28 so as to be movable by the detents 24 on shaft 22 when shaft 22 is rotated.

Figure 2:
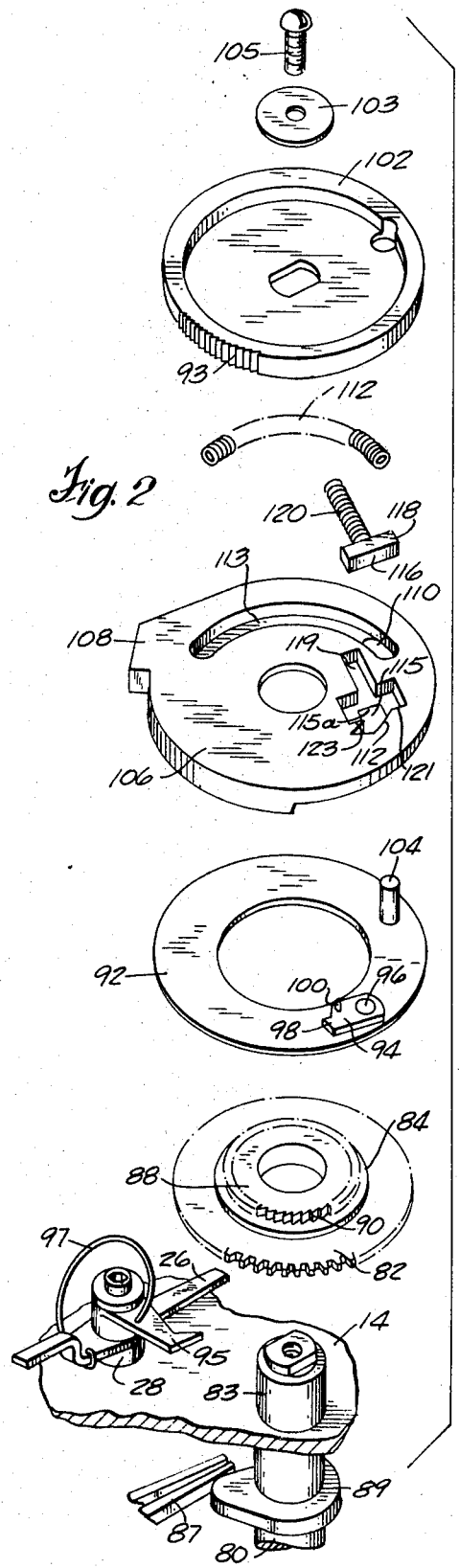
FIG. 2 is an exploded, detailed view of the clutch showing the various elements thereof.

Turning now to FIG. 2, which shows the elements of clutch 10 in detail, the driving member of clutch 10 includes a gear 82 which is driven by timing motor 16 through gear 18. Gear 82 is rotatably mounted on base member 14 by bushing 83 so as to lie adjacent base member 14. The output shaft 80 of clutch 10 may be rotatably journaled inside bushing 83 so as to lie along the axis of gear 82.

Gear 82 includes collar 84 and circular plate 88 which are affixed to the gear. Circular plate 88 has a slightly smaller radial dimension than collar 84. The outer periphery of circular plate 88 contains a plurality of notches or teeth 90 which are used in the engagement and disengagement of clutch 10, in a manner hereinafter described. The aforesaid elements of clutch 10 comprise the driving member thereof.

Figure 3:
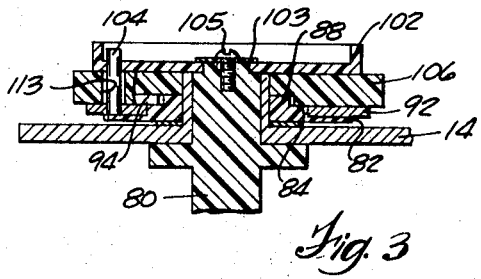
FIG. 3 is a cross-sectional view of the clutch of the present invention, the view being taken along the line 3—3 of FIG. 1.

An annulus or disc 92 is rotatably positioned on collar 84 in radial alignment therewith so as to be positioned axially above gear 82 and below circular plate 88. See the cross-sectional view of FIG. 3. Disc 92 may hereinafter, and in the claims, be called the first disc. The radial dimension of first disc 92 exceeds that of circular plate 88. A pawl 94 is pivotally mounted on the upper surface of disc 92 and near the perimeter thereof so as to be engageable with the peripheral teeth 90 of circular plate 88 mounted just above disc 92.

As shown most clearly in FIG. 2, pawl 94 is mounted on pin 96 of first disc 92. A projection 98 on pawl 94 is suitable for engaging teeth 90 when pawl 94 is pivoted toward circular plate 88. A pin 100 extends from the exposed surface of pawl 94 for coaction with camming surfaces, hereinafter described, which move pawl 94 into and out of engagement with teeth 90.

First disc 92 forms the driven member of clutch 10. As such, it is connected to output shaft 80. In the presently preferred embodiment of clutch 10, disc 92 is connected to the output shaft 80 through power transmission cap 102 which is keyed to the end of output shaft 80 and affixed thereto by means of washer 103 and bolt 105. A pin 104, affixed to first disc 92, extends through a hole in cap 102 to provide the desired connection of disc 92 to output shaft 80. It will be appreciated that output shaft 80 may extend in both directions from cap 102 rather than only through base member 14, as shown in the drawing.

A second disc 106 is rotatably mounted on bushing 83 above first disc 92 and circular plate 88 and below cap 102. Second disc 106 includes stop 108 for engaging trigger bar 26 which initiates the operation of clutch 10. With clutch 10 in the disengaged condition, trigger bar 26 is positioned in the path of stop 108 to prevent second disc 106 from rotating. See FIG. 4b.

Pin 104, connecting first disc 92 to cap 102, extends through arcuate slot 110 in second disc 106 so that second disc 106 rotates with first disc 92. However, limited arcuate reciprocal movement between discs 92 and 106 is possible within the limits imposed by the length of slot 110. A spring 112 is positioned in slot 110 to provide a force on pin 104 which tends to move pin 104 into one end of slot 110. A bottom wall 113 may be provided through a portion of slot 110 to assist in retaining spring 112 in the slot.

A portion of the periphery of cap 102 contains a series of ratchet teeth 93 in which may be inserted pawl 95. Pawl 95 is pivotally mounted on base member 14 in journal 28 which also journals trigger bar 26, and is biased into contact with cap 102 by spring 97. Pawl 95 and teeth 93 prevent the driven member of clutch 10 from rotating in a clockwise direction when viewed in FIG. 2. The teeth are arcuately positioned on the periphery of cap 102 so that pawl 95 will engage them when clutch 10 is in the disengaged condition. This necessitates positioning the teeth with respect to stop 108 which controls the engagement and disengagement of clutch 10. Teeth 93 may be placed on other portions of the driven member of clutch 10, such as first disc 92 or output shaft 80 and pawl 95 positioned accordingly.

Second disc 106 is reciprocally movable relative to first disc 92 to effect the engagement and disengagement of clutch 10. Second disc 106 contains a cutout portion, or hole, 115 through which pin 100 of pawl 94 extends. A side of the cutout portion forms a first camming surface 112 for moving pawl 94 into engagement with peripheral teeth 90 of circular plate 88 in a manner hereinafter described.

A T-shaped trough 119 is positioned along one side of hole 115 and includes a notch 115a which is an extension of hole 115. A bar 118 having a camming surface 116 lies in the cross of T-shaped trough 119 while spring 120 is inserted in the stem of the trough. Spring 120 biases bar 118 against surfaces 121 and 123. The camming surface 116 of bar 118 is used to move pawl 94 out of engagement with peripheral teeth 90 of circular plate 88.

Figure 4A:
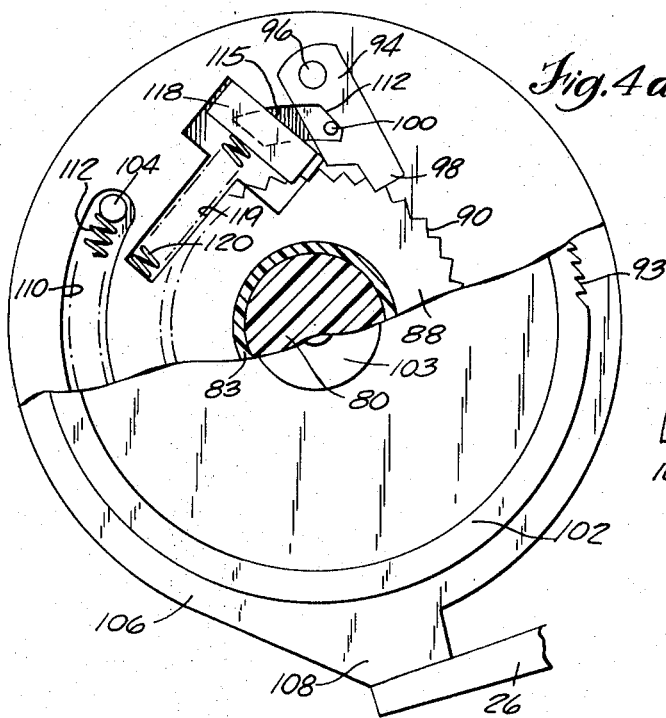
FIGS. 4a, b, c, and d are partial, detailed, cross-sectional views of portions of the clutch of the present invention, showing the engagement and disengagement of the driving and driven members thereof.
Figure 4C:
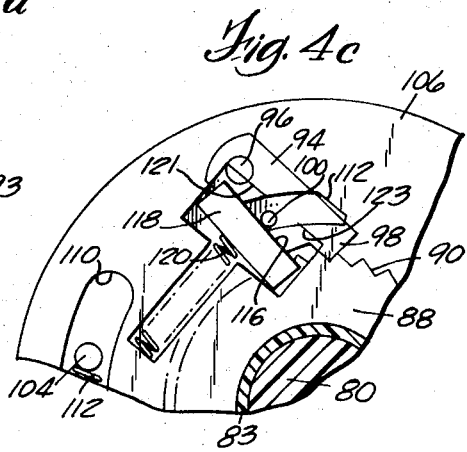
Figure 4B:
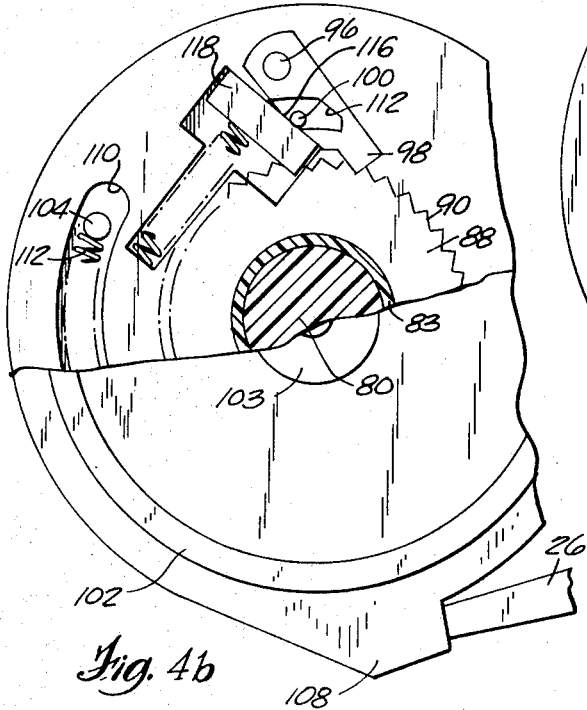
Figure 4D:
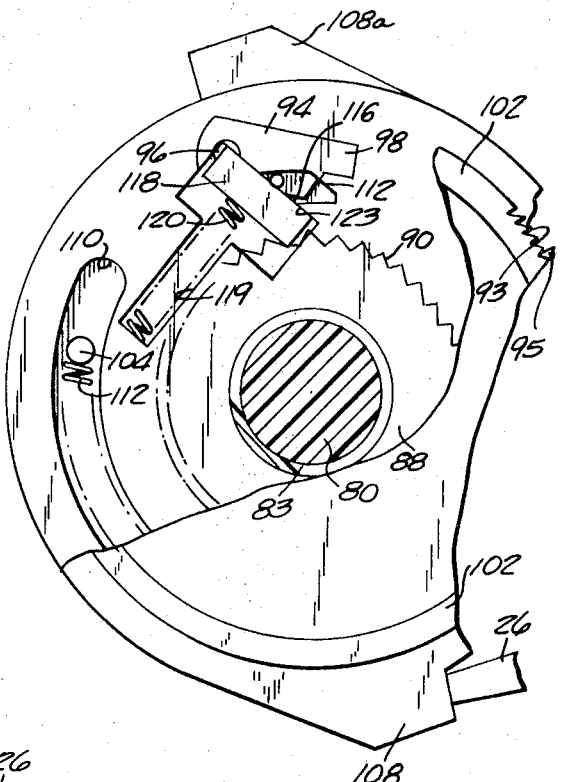

The operation of clutch 10 may be described by initially considering the clutch in the disengaged state, then observing the engagement of the clutch, and finally the disengagement of the clutch and its return to the disengaged state. As noted supra, gear 82 of the driving member of clutch 10 is powered by timing motor 16 through gear 18. Gear 82 rotates circular plate 88 in a counterclockwise direction as viewed in FIG. 2. With clutch 10 in the disengaged state, as shown in FIG. 4d, the driven elements of the clutch, including output shaft 80, first disc 92, and cap 102 are stationary. These elements are retained in position by the coaction of ratchet teeth 93 on cap 102 and pawl 95. Pawl 94 is pivoted outward and away from circular plate 88 and teeth 90 so that the pawl is disengaged from the teeth. Pin 100 lies along camming surface 116 of bar 118 which is in abutment with walls 121 and 123 of hole 115. Second disc 106 is also stationary as trigger bar 26 is behind stop 108. Pin 104 is away from the end of slot 110 and spring 112 is compressed.

In the initiation of the engagement of clutch 10, trigger bar 26 is moved from behind stop 108. See FIG. 4a. This permits second disc 106 to rotate in a counterclockwise direction with respect to first disc 92 driven by the force of compressed spring 112 which returns pin 104 toward the end of slot 110, by rotating second disc 106. First disc 92 cannot rotate clockwise responsive to the force of compressed spring 112 because of the engagement of pawl 95 in teeth 93 of cap 102. Trigger bar 26 may then be released and allowed to ride along the outside of disc 106. The counterclockwise rotation of second disc 106 moves camming surface 112 into abutment with pin 100. This pivots pawl 94 inwardly into engagement with peripheral teeth 90 of circular plate 88 so that circular plate 88 drives first disc 92 which rotates output shaft 80 by means of pin 104 and cap 102. The driving forces exerted on pawl 94 by teeth 90 tend to secure the engagement of the pawl in the teeth. The rotation of output shaft 80 is in the counterclockwise direction and may be used to open and close switching contacts 87 by means of cam 89. Teeth 93 and pawl 95 do not obstruct the rotation of cap 102 and first disc 92 in the counter clockwise direction. As shown in FIGS. 4a, 4b, and 4c the engagement of pin 100 of pawl 94 with camming surfaces 112 and 116 to effect engagement and disengagement of clutch 10 takes place generally along a radial line extending from the axis of rotation of clutch 10 to the pivot point of pawl 94. The leverage provided by this contact facilitates the camming action.

After the driven elements of clutch 14 have rotated almost one complete revolution, trigger bar 26 abuts stop 108 and prevents rotation of second disc 106. See FIG. 4b. First disc 92 continues to rotate responsive to the driving force provided by circular plate 88 so that the relative motion of second disc 106 containing the camming surfaces for pawl 94, with respect to first disc 92, is clockwise. Pawl 95 begins to engage teeth 93 of cap 102 thereby limiting the direction of rotation of the driven member of clutch 10 to the counterclockwise direction. The continued rotation of first disc 92 moves pin 104 away from the end of slot 110 so as to compress spring 112 in preparation for the next engagement of clutch 10. It also moves pin 100 of pawl 94 into abutment with camming surface 116 of bar 118, as shown in FIG. 4b.

Further relative rotation of first disc 92 and second disc 106 causes pin 100 of pawl 94 to move bar 118 out of abutment with walls 121 and 123 and rearwardly in trough 119 as pin 100 moves from hole 115 into notch 115a. See FIG. 4c. The movement of bar 118 compresses spring 120. However, the pressure exerted on bar 118 and pin 100 by the compression of spring 120 is insufficient to dislodge pawl 94 from teeth 90 of circular plate 88 because of the greater forces exerted on the latter members by the coupling action between the driving and driven members of the clutch.

Eventually, bar 118 is moved to the rear of trough 119 by pin 100 and becomes stationary. At this point, the continued relative rotation between first disc 92 and stationary second disc 106 and camming surface 116 moves pawl 94 out of engagement with teeth 90 of circular plate 88 by means of the coaction of pin 100 with camming surface 116. This disengages the clutch. As soon as pawl 94 is disengaged from teeth 90, bar 118 moves forward, driven by compressed spring 120. The coaction of camming surface 116 and pin 100, as bar 118 moves forward, moves pawl 94 further away from teeth 90 and insures the disengagement of clutch 10, as shown in FIG. 4d.

When pawl 94 is moved out of engagement with peripheral teeth 90, clutch 10 is disengaged and disc 92, cap 102, and output shaft 80 cease to rotate. Teeth 93 and pawl 95 prevent any further movement of disc 92 in the clockwise direction, while spring 112 bearing on pin 104 resists movement of the driven member in the counterclockwise direction. Pawl 94 is retained in the disengaged position while spring 112 is retained in the compressed state ready for further engagement of clutch 10.

While the embodiment of the clutch shown in the foregoing description provides for one complete revolution of the driven member, including output shaft 80, each time the clutch is engaged, it may be modified by the use of additional stops 108a on the periphery of second disc 106 to provide only a partial revolution for each clutch-engaging operation. It will be appreciated that other modifications and alterations may be made to the clutch without departing from the true spirit and scope of the invention as defined in the following claims.

I claim:

1. A clutch for selectively coupling a driving member to a driven member for rotating the latter from a power source comprising:
   a base member;
   a driving member comprised of a circular plate journaled in said base member, said plate rotatably drivable by the power source and having teeth about the periphery thereof; and
   a driven member including a first disc journaled on said base member coaxially with said circular plate, said first disc being axially adjacent said plate and having a greater radial dimension than said circular plate, a pawl pivotally mounted on said first disc at a pivot point located a greater radial distance from the common axis of the first disc and circular plate than the radius of the latter, said pawl being pivotally movable into and out of engagement with the peripheral teeth of said circular plate, a second disc journaled on said base member coaxially with said first disc and axially adjacent said first disc, and means linking said second disc to said first disc for rotating the former with the latter while permitting limited reciprocal arcuate movement of said second disc with respect to said first disc, said second disc containing a camming surface engaging said pawl, said camming surface being so located on said second disc as to engage said pawl generally along a radial line extending from said common axis to said pivot point for pivotally moving said pawl into engagement with the peripheral teeth of said circular plate during limited relative arcuate movement in one direction of said first and second discs for drivingly connecting said first disc to said circular plate to couple said driving member to said driven member.

2. The clutch of claim 1 wherein said means linking said first disc with said second disc includes bias means for generating force aiding said limited relative movement in said one direction and opposing said limited relative movement in the other direction.

3. The clutch of claim 2 including means for arresting the rotation of said second disc, whereby the driving connection between said first disc and said circular plate effects the relative motion in the other direction between said first and second discs against the force of said bias means, said second disc containing an additional camming surface, said additional camming surface being formed and located on said second disc to engage said pawl generally along said radial line to move said pawl out of engagement with the peripheral teeth of said circular plate during said relative movement in the other direction thereby decoupling said driving member from said driven member.

4. The clutch according to claim 3 further including means for arresting the movement of said first disc at the end of said relative movement in the other direction and for retaining said first and second discs in a condition of relative arcuate displacement when said pawl is out of engagement with the peripheral teeth of said circular plate, thereby to retain the clutch in the decoupled position against the force of said bias means.

5. The clutch according to claim 3 wherein said additional camming surface is formed by a member mounted in said second disc for limited movement with respect thereto and presenting said additional camming surface to said pawl generally along said radial line, whereby said pawl moves said member the limited amount in said second disc during the initial portions of the relative movement in the other direction between said first and second discs and said movable member becomes stationary during the terminal portions of said relative movement for effecting the disengagement of said pawl from said peripheral teeth.

6. The clutch according to claim 5 wherein said movable member includes a second bias means for generating a force opposing the force exerted on said movable member by the engagement with said pawl, said second bias means restoring said movable member to its original position subsequent to the disengagement of said pawl with said peripheral teeth, the coaction of said pawl and said movable member during the restorative motion moving said pawl further out of engagement with said peripheral teeth.

7. The clutch according to claim 2 wherein said clutch includes a plurality of means for arresting the rotation of the second disc and decoupling said driving member from said driven member after the former has rotated the latter a desired amount.

8. The clutch according to claim 1 wherein said driven member includes an output shaft journaled in said base member along the axis of said circular plate and said first and second disc, said output shaft being drivingly connected to said first disc.

9. A clutch for selectively coupling a driving member to a driven member for rotating the latter from a power source comprising:
a base member;
a driving member comprised of a circular plate journaled in said base member, said plate being rotatably drivable by the power source and having teeth about the periphery thereof; and
a driven member including a first disc journaled on said base member coaxially with said circular plate, said first disc being axially adjacent said plate and having a greater radial dimension than said circular plate, a pawl pivotally mounted on said first disc at a point located a greater radial distance from the common axis of the first disc and circular plate than the radius of the latter, said pawl being pivotally movable into and out of engagement with the peripheral teeth of said circular plate, a second disc journaled on said base member coaxially with the first disc and axially adjacent said first disc, means linking said second disc to said first disc for rotating the former with the latter while permitting limited relative arcuate movement of said second disc with respect to said first disc in either direction, said linking means including first bias means for generating force aiding said limited relative movement in one direction and opposing said limited relative movement in the other direction, said second disc containing a camming surface engaging said pawl for pivotally moving said pawl into engagement with the peripheral teeth of said circular plate during relative arcuate movement in one direction between said first and second discs for drivingly connecting said first disc to said circular plate to couple said driving member to said driven member, said clutch including means for arresting the rotation of said second disc, to cause the driving connection between said first disc and said circular plate to effect relative motion in the other direction between said first and second discs against the force of said first bias means, said second disc containing an additional camming surface formed by a member mounted in said second disc for limited movement with respect thereto and presenting said additional camming surface for engagement by said pawl, said additional camming surface being so located on said second disc that said pawl moves said member the limited amount in said second disc during the initial portions of the relative movement in the other direction between said first and second discs and said movable member becomes stationary during the terminal portions of said relative movement for effecting the disengagement of said pawl from said peripheral teeth.

10. The clutch according to claim 9 further including means for arresting the movement of said first disc at the end of said relative movement in the other direction and for retaining said first and second discs in a condition of relative arcuate displacement when said pawl is out of engagement with the peripheral teeth of said circular plate, thereby to retain the clutch in the decoupled position against the force of said bias means.

11. The clutch according to claim 9 wherein said movable member includes a second bias means for generating a force opposing the force exerted on said movable member by the engagement with said pawl, said second bias means restoring said movable member to its original position subsequent to the disengagement of said pawl with said peripheral teeth, the coaction of said pawl and said movable member during the restorative motion moving said pawl further out of engagement with said peripheral teeth.

12. The clutch according to claim 9 wherein said driven member includes an output shaft journaled in said base member along the axis of said circular plate and said first and second discs, said output shaft being drivingly connected to said first disc.